(12) United States Patent
Vallance et al.

(10) Patent No.: US 6,267,096 B1
(45) Date of Patent: Jul. 31, 2001

(54) THREE-VALVE CYLINDER HEAD SYSTEM

(75) Inventors: James Kirkland Vallance, Northville; Jialin Yang, Canton; Richard Walter Anderson, Ann Arbor, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/479,816

(22) Filed: Jan. 7, 2000

(51) Int. Cl.$^7$ .................................................. F02B 31/08
(52) U.S. Cl. ......................... 123/301; 123/302; 123/305; 123/308
(58) Field of Search ................................. 123/294, 301, 123/302, 305, 308, 432

(56) References Cited

U.S. PATENT DOCUMENTS

| | | |
|---|---|---|
| 4,920,937 | 5/1990 | Sasaki . |
| 4,958,604 | 9/1990 | Hashimoto . |
| 5,065,711 * | 11/1991 | Lesley ................................. 123/308 |
| 5,245,975 | 9/1993 | Ito . |
| 5,259,348 | 11/1993 | Kobayashi . |
| 5,479,889 | 1/1996 | Sato . |
| 5,553,588 | 9/1996 | Gono . |
| 5,676,107 | 10/1997 | Yuzuriha . |
| 5,735,240 | 4/1998 | Ito et al. . |
| 6,109,234 * | 8/2000 | Vallance et al. ..................... 123/308 |

FOREIGN PATENT DOCUMENTS

| | | | |
|---|---|---|---|
| 42 05 237 * | 8/1993 | (DE) ..................................... 123/301 |
| 0 778 402 A1 | 11/1997 | (EP) . |
| 60-35114 * | 2/1985 | (JP) ..................................... 123/301 |
| 60-67719 * | 4/1985 | (JP) ..................................... 123/302 |

* cited by examiner

*Primary Examiner*—Erick Solis
(74) *Attorney, Agent, or Firm*—Jerome R. Drouillard

(57) ABSTRACT

A three-valve cylinder head system for a direct-injected spark-ignited (DISI) internal combustion engine. Two inlet ports are positioned in opposite quadrants of the cylinder head, with the fuel injector directing fuel spray into a third quadrant and the exhaust port being positioned in the fourth quadrant. A helicoid intake port and an axially directed intake port generate a swirl-type air flow in the piston cylinder without the aid of flow activation devices. The spark plug is positioned centrally adjacent the longitudinal axis of the cylinder bore. The piston has a bowl in its upper surface with an enlarged downstream area and a harbor area adjacent and past the spark plug which allow the swirl-type air flow to mix with the fuel spray and provide an appropriate fuel air mixture at the spark plug.

6 Claims, 2 Drawing Sheets

THREE-VALVE CYLINDER HEAD SYSTEM

CROSS-REFERENCE TO RELATED APPLICATIONS

The present application is related to U.S. patent application Ser. No. 09/174,237, filed Oct. 16, 1998, entitled "Cylinder Head Intake System" and is also related to U.S. patent application Ser. No. 09/469,050, entitled "Combustion Chamber for DISI Engines with Swirl Airflows", filed concurrently with the present application, the disclosures of both of which are hereby incorporated by reference herein.

TECHNICAL FIELD

The present invention relates to a piston and cylinder configuration for a three-valve internal combustion engine.

BACKGROUND

Internal combustion engines are known which utilize spark-ignited direct injection (DISI) systems. The fuel injection mechanisms spray a fuel mist directly into each cylinder and inlet air is directed into the cylinder from one or more inlet ports to produce an appropriate air flow and air-fuel mixture in the combustion chamber. The air-fuel mixture is ignited by a spark plug during each cycle of the piston in the cylinder bore. Various piston bowl and combustion chamber configurations have been devised in order to provide appropriate air-fuel mixtures and to direct them toward the spark plug for ignition.

A number of these known systems constitute four-valve systems which contain two inlet valves and two exhaust valves in each cylinder. The two inlet valves introduce air into the combustion chamber and the two exhaust valves remove waste products from the combustion chamber once the combustion is finished. Some smaller bore engines utilize two or three valves. In three valve systems, two inlet valves and one exhaust valve are provided, with the exhaust valve typically being larger than the inlet valves and positioned on one side of the cylinder head while the two inlet valves are positioned on the opposite side.

In efforts to improve ignition under various load conditions and to reduce soot and undesirable emissions, various types of air flows have been induced in the combustion chamber. These include normal tumble flows, reverse tumble flows, and swirl-type flows. The tumble types of air flow produce air flows which circulate around an axis transverse to the axis of the cylinder bore, while the swirl-types of air flow produce air flows with an axis parallel to the axis of the cylinder bore. There also are systems which utilize both tumble and swirl-type air flows separately or in combination at various portions of the combustion cycle.

In order to produce swirl-type air flows, often swirl-type flow activation valves are used in one or more of the inlet ports. Such valve mechanisms contribute additional cost and complexity to the engine system and frequently have difficulties in operation at lower power stages of engine operation.

Three-valve engines reduce the complexity and number of parts of an internal combustion engine, but also often need a swirl control flow activation valve to produce swirl-type air flows. Also, some known three-valve engines require two spark plugs in each cylinder which also adds additional cost and complexity in the operation of the internal combustion engine. In three-valve systems which use a single spark plug, the spark plug is typically positioned off-center from the central axis of the cylinder bore which limits the performance and/or emission characteristics of the engine.

An object of the present invention is to provide an improved three-valve internal combustion engine in which the valve, ports and injector are located and configured in the manner to overcome the above-mentioned shortcomings of previous three-valve internal combustion engines. Another object of the present invention is to provide a more efficient three-valve internal combustion engine which has improved ignition performance and reduced emissions.

SUMMARY OF THE INVENTION

In accordance with the present invention, a piston and cylinder head configuration for an internal combustion engine is provided with a unique arrangement of three-valves and fuel injector. The system has two intake valves and one exhaust valve, together with a centrally located spark plug. An axially directed intake port and a tangentially directed intake port generate a strong intake swirl motion in the cylinder for the stratified-charge direct injected spark ignited (DISI) engine without the aid of flow activation devices, such as port throttles. The unique port design reduces the resistance of the intake flow and increases the volumetric efficiency of the engine. Other alternate designs of intake ports which produce a swirl-type airflow can also be utilized.

The two intake ports and the exhaust port are positioned in three of the four quadrants of the cylinder. The fuel injector is positioned in, or adjacent to, the fourth quadrant which is the coolest part of the combustion chamber. The fuel injector has an angle of 35–60° to the horizontal and an angle of about 0–15° to the downstream side of the spark plug.

At high engine loads with intake-stroke fuel injection, the large spray angle axis reduces cylinder bore wetting. At high engine speeds with compression-stroke injection, the large spray-axis angle allows earlier fuel injection to extend fuel evaporation time. The larger spray-axis angle, as well as the relatively longer distance between the injector and the intake valve, also avoids fuel spray impingement during intake-stroke injection. By placing the injector at the coolest region of the combustion chamber, injector coking and deposits are reduced.

Other features, objects and advantages of the present invention will become apparent from the following description of the invention, when viewed in accordance with the attached drawings and appended claims.

DESCRIPTION OF THE PREFERRED EMBODIMENT(S)

Figure 1:
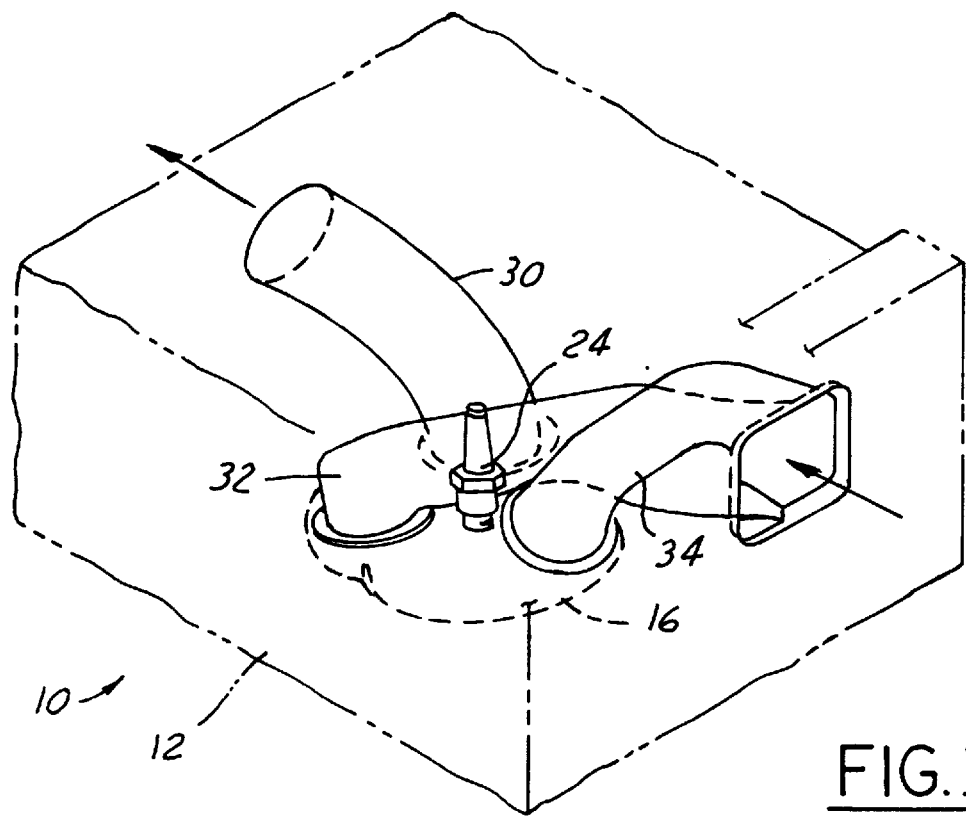
FIG. 1 is a perspective view of the air intake ports and exhaust port of an internal combustion engine in accordance with the present invention.
Figure 2:
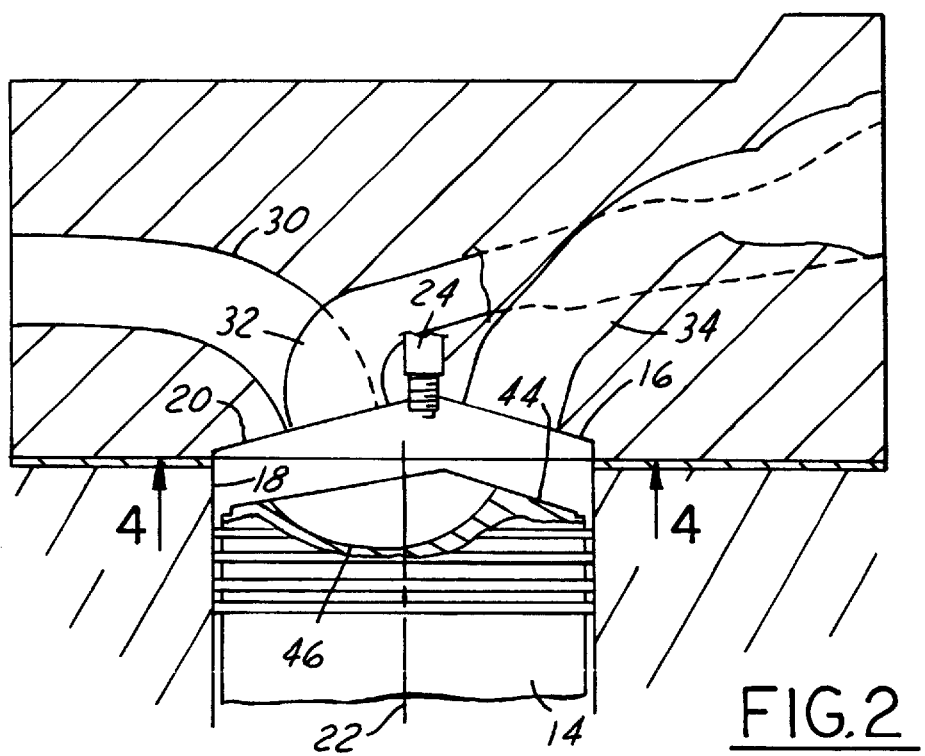
FIG. 2 is a partial cross-sectional view of an internal combustion engine, illustrating the features of the present invention.

The design and arrangement of the two intake ports in accordance with the present invention generates a swirl-type flow of inlet air in the cylinder of a stratified-charge direct-injected spark-ignited (DISI) internal combustion engine without any flow activation devices such as port throttles. The port design reduces the resistance of the intake air flow. A centrally located spark plug improves ignitability and reduction of undesirable emissions. The downward angle of the fuel injector reduces cylinder bore wetting and extends fuel evaporation time which provide an improved air-fuel mixture and ignitability.

FIGS. 1–5 illustrate one preferred embodiment of the present invention. The inventive three-valve system for use with internal combustion engine is referred generally to the reference numeral 10 in the drawings.

The system 10 includes an engine 12 of which only a portion is shown, the engine having a plurality of pistons and cylinder chambers or bores, only one of which is shown for illustrative purposes. The system 10 includes a piston 14 and a cylinder head 16, the piston being positioned in a cylinder chamber or bore 18. The cylinder head 16 has a lower wall 20 with a pair of slanted or sloping portions angled upwardly toward the central longitudinal axis 22 of the cylinder bore. A spark plug 24 is positioned in the center of the cylinder head 16 approximately along the central axis 22.

Figure 3:
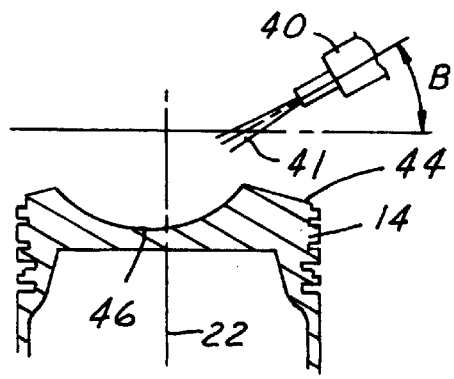
FIG. 3 is another partial cross-sectional view of an engine cylinder configuration in accordance with the present invention.
Figure 4:
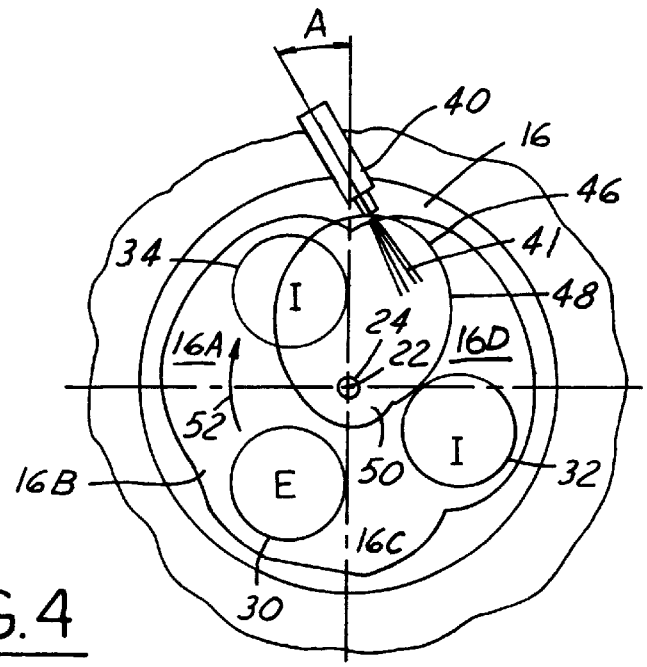
FIG. 4 is a top elevational view of a cylinder illustrating the placement and configuration of the inlet ports, exhaust port, spark plug and fuel injector in accordance with the present invention.
Figure 5:
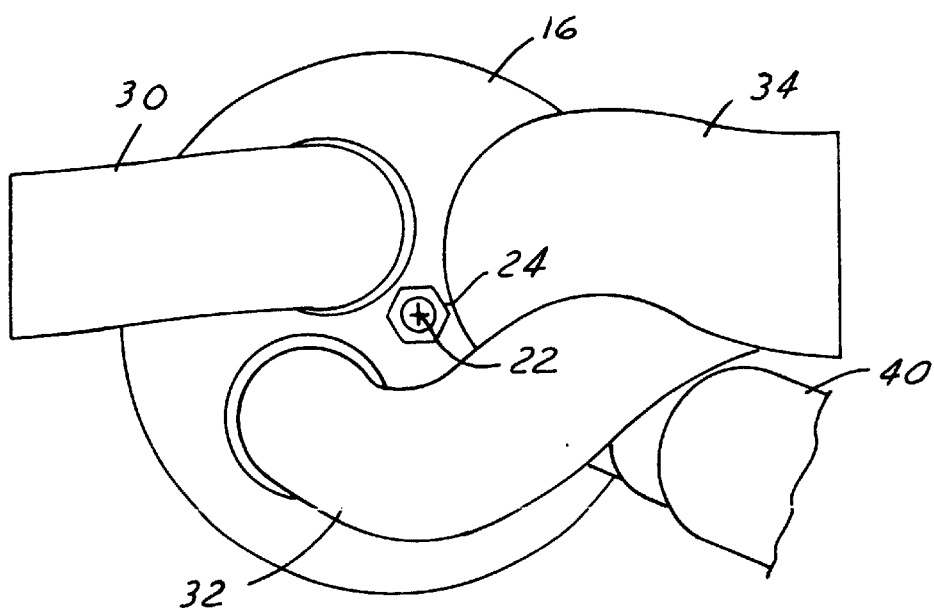
FIG. 5 is another illustration of the placement of the air intake ports and exhaust port of the three-valve internal combustion engine in accordance with the present invention.

A pair of intake or air inlet ports 32 and 34 are positioned on the cylinder head 16, together with one exhaust port 30. In this regard, as shown in FIG. 3, the cylinder head 16 can be divided into four quadrants, 16A, 16B, 16C and 16D, with the inlet ports 32 and 34 being positioned in quadrants 16C and 16A, respectively, while the exhaust port 30 is positioned in quadrant 16B.

A fuel injector 40 is positioned in the cylinder head 16 and is angled at an angle A in order to direct the fuel spray 41 into the fourth quadrant, namely quadrant 16D of the cylinder head 16. The injector 40 can also be positioned in the quadrant 16D. The injector 40 can be of any conventional design and is operated by a conventional fuel spray injector control and system (not shown). Angle A is preferably on the order of 0–15° and more preferably about 10°.

The fuel injector 40 is also positioned at an angle B from a horizontal plane, that is a plane which is transverse to the central axis 22 of the cylinder bore. This is shown in FIG. 3. Angle B is preferably in the range from 35–60° and preferably approximately 50–55°.

The piston 14 has an upper or top surface 44 and a combustion bowl 46 is positioned in the top surface. The shape or configuration of the bowl 46 is preferably shown in FIG. 4. The shape is described in more detail in co-pending U.S. patent application, Ser. No. 09/469,050, entitled "Combustion Chamber for DISI Engines with Swirl Airflows", which is filed concurrently herewith, the disclosure of which is hereby incorporated by reference herein. In accordance with that application, the piston bowl has a wide or larger area 48 downstream of the fuel injector 40 in the direction of the air flow 52. In addition, the bowl has a "harbor" area 50 adjacent the spark plug location and which extends upstream of the airflow in a direction away from the fuel injector.

Air intake or inlet port 32 is a helicoid intake port which is described in more detail in co-pending U.S. patent application, Ser. No. 09/174,237, filed Oct. 16, 1998, entitled "Cylinder Head Intake System", the disclosure of which is hereby incorporated by reference herein. The air intake port 32 is formed about a spiral axis comprised of a series of incremental arc lengths, having respective radii that change in magnitude and elevation as the air intake port approaches the port entrance (at the lower wall of the cylinder head). This provides air flow with an in-cylinder swirl 52 about the central longitudinal axis 22 of the cylinder bore. The second intake or air inlet port 34 also introduces inlet air into the cylinder bore. The configuration of the helicoid intake port 32 and the second or axially directed intake port 34 provides a strong swirl-type airflow in the piston cylinder without the aid of flow activation devices. This intake port design also reduces the resistance of the intake flow and provides a high volumetric efficiency of the engine.

The present three-valve engine design is particularly useful for small bore DISI engines, on the order of 70 millimeters.

Positioning the spark plug 24 in the center of the cylinder head is desirable for faster burning of the air-fuel mixture and to reduce the tendency for the engine to knock. This also is an improvement over prior three-valve engines which utilize either an off-center spark plug or a pair of spark plugs on opposite sides of the cylinder head.

The positioning of the fuel injector with a relatively large angle B to the horizontal improves the combustion of the system. At high engine loads with intake-stroke fuel injection, the large spraying axis angle B reduces cylinder bore wetting. The fuel is directed downwardly against the top wall of the piston and into the combustion bowl 46. Secondly, at high engine speed with compression-stroke injection, the larger spray-axis angle B allows earlier fuel injection to extend the fuel evaporation time. The larger spray-axis angle as well as the relatively longer distance between the fuel injector and the intake valve avoids spray-valve impingement during the intake stroke injection.

Placing the fuel injector 40 adjacent to or in the fourth quadrant 16D of the cylinder head 16 positions the injector in the coolest region of the combustion chamber. This reduces coking and deposits on the fuel injector.

With the present invention, a reduction of the cylinder wall wetting is achieved. This increases the durability and length of service of the engine. The wetting of the piston instead of the cylinder wall also provides better mixing of the air and fuel in the cylinder, especially if the system is programmed for early injection.

By increasing the distance from the fuel injector 40 to the first intake or inlet port 32, less fuel enters the inlet ports. Also, the longer distance between the fuel injector and the top wall of the piston increases the time that the fuel spray droplets can evaporate before they make contact with the surface.

The swirl-type airflow 52 in the cylinder also helps direct the fuel spray 41 into the larger area 48 of the piston bowl 46. The swirl air flow allows the fuel and air to mix together to form an acceptable cloud or mixture which then advances along the wall of the piston bowl into the harbor area 50 where the spark plug is located. The movement of the piston and the curved side walls of the piston bowl 46 help direct the fuel air mixture toward the spark plug so it can be ignited in a more optimum manner.

Various types of intake ports can be used to create a swirl-type airflow in the cylinder. These include "tangent" or "tangentially directed" intake ports and "helical" or "helicoid" intake ports. The tangent ports have a width which gradually reduces as the valve closes, and it becomes off-center to one side. The helical ports have a helical shape so that the air gains momentum as it flows through the intake port. As alternate embodiments of the invention, a tangent inlet port can be used for the inlet valve farthest from the fuel injector, while the helical inlet port can be used for the inlet port adjacent the injector.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. An in-cylinder injection internal combustion engine having a cylinder bore, a cylinder head with four quadrants, a piston positioned in said cylinder bore and a combustion chamber formed by the cylinder head lower wall and the top surface of the piston, said engine comprising:

a helicoid intake port positioned in a first quadrant of said cylinder head lower wall;

an axially directed intake port positioned in a second quadrant of said cylinder head lower wall;

said helicoid and axially directed intake ports producing a swirl-type air flow in the cylinder;

an exhaust port positioned in a third quadrant of said cylinder head lower wall;

a spark plug positioned in said cylinder head lower wall substantially along the central axis of the cylinder; and a fuel injector positioned in said fourth quadrant of said cylinder head lower wall for directing fuel toward said helicoid intake port.

2. The in-cylinder injection internal combustion engine as set forth in claim 1 wherein said first and second quadrants are diametrically opposite to one another on said cylinder head lower wall.

3. The in-cylinder injection internal combustion engine as set forth in claim 1 further comprising a combustion bowl in the top wall of the piston.

4. The in-cylinder injection internal combustion engine as set forth in claim 1 wherein said fuel injector is positioned at an angle from 35–60° from the horizontal and directs the fuel spray toward the top surface of said piston.

5. The in-cylinder injection internal combustion engine as set forth in claim 1 wherein said fuel injector is positioned at an angle of 0–15° from an imaginary plane positioned between said fuel injector and said central axis.

6. The in-cylinder injection internal combustion engine as set forth in claim 3 wherein said combustion bowl has a larger area downstream of said fuel injector and a harbor area adjacent said spark plug.

* * * * *